United States Patent
Rached et al.

(10) Patent No.: US 11,053,420 B2
(45) Date of Patent: Jul. 6, 2021

(54) COMPOSITION ON THE BASIS OF HYDROCHLOROFLUOROOLEFIN AND MINERAL OIL

(71) Applicant: Arkema France, Colombes (FR)

(72) Inventors: Wissam Rached, Chaponost (FR); Pascale Kindler, Fontaines-sur-Saone (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 16/641,024

(22) PCT Filed: Sep. 7, 2018

(86) PCT No.: PCT/FR2018/052188
§ 371 (c)(1),
(2) Date: Feb. 21, 2020

(87) PCT Pub. No.: WO2019/053355
PCT Pub. Date: Mar. 21, 2019

(65) Prior Publication Data
US 2020/0216734 A1 Jul. 9, 2020

(30) Foreign Application Priority Data
Sep. 12, 2017 (FR) ...................................... 1758429

(51) Int. Cl.
*C09K 5/04* (2006.01)

(52) U.S. Cl.
CPC ........ *C09K 5/044* (2013.01); *C09K 2205/122* (2013.01); *C09K 2205/126* (2013.01)

(58) Field of Classification Search
CPC .............. C09K 5/044; C09K 2205/122; C09K 2205/126; C10M 2203/1006; C10M 171/008; C10N 2020/099; C10N 2020/101; C10N 2030/10; C10N 2030/20
USPC ........................... 252/67, 68, 69; 62/467, 529
See application file for complete search history.

(56) References Cited

U.S. PATENT DOCUMENTS

| | | | |
|---|---|---|---|
| 5,065,990 A | 11/1991 | Durfee | |
| 5,363,674 A | 11/1994 | Powell | |
| 6,814,884 B2 | 11/2004 | Jannick et al. | |
| 7,674,756 B2 | 3/2010 | Johnson | |
| 7,795,480 B2 | 9/2010 | Merkel et al. | |
| 8,070,977 B2 | 12/2011 | Rached | |
| 8,075,798 B2 | 12/2011 | Rached | |
| 8,217,208 B2 | 7/2012 | Hulse et al. | |
| 8,246,850 B2 | 8/2012 | Rached | |
| 8,252,198 B2 | 8/2012 | Rached | |
| 8,323,524 B2 | 12/2012 | Flynn et al. | |
| 8,454,853 B2 | 6/2013 | Van et al. | |
| 8,557,135 B2 | 10/2013 | Rached | |
| 8,808,569 B2 | 8/2014 | Rached | |
| 8,858,824 B2 | 10/2014 | Boussand | |
| 8,858,825 B2 | 10/2014 | Guerin et al. | |
| 9,011,711 B2 | 4/2015 | Rached | |
| 9,028,706 B2 | 5/2015 | Rached et al. | |
| 9,039,922 B2 | 5/2015 | Rached | |
| 9,127,191 B2 | 9/2015 | Rached | |
| 9,133,379 B2 | 9/2015 | Rached | |
| 9,175,203 B2 | 11/2015 | Rached | |
| 9,267,064 B2 | 2/2016 | Rached | |
| 9,279,074 B2 | 3/2016 | Rached | |
| 9,315,708 B2 | 4/2016 | Guerin et al. | |
| 9,399,726 B2 | 7/2016 | Rached | |
| 9,505,968 B2 | 11/2016 | Rached | |
| 9,512,343 B2 | 12/2016 | Rached et al. | |
| 9,599,381 B2 | 3/2017 | Rached | |
| 9,650,551 B2 | 5/2017 | Collier et al. | |
| 9,650,553 B2 | 5/2017 | Deur-Bert et al. | |
| 9,663,697 B2 | 5/2017 | Rached | |
| 9,676,984 B2 | 6/2017 | Guerin et al. | |
| 9,683,155 B2 | 6/2017 | Deur-Bert et al. | |
| 9,683,157 B2 | 6/2017 | Rached | |
| 9,884,984 B2 | 2/2018 | Rached | |
| 9,908,828 B2 * | 3/2018 | Rached | ................... F01K 25/10 |
| 9,969,918 B2 | 5/2018 | Deur-Bert et al. | |
| 10,023,780 B2 | 7/2018 | Guerin et al. | |
| 10,035,938 B2 | 7/2018 | Rached | |
| 10,036,285 B2 | 7/2018 | Rached | |
| 10,119,055 B2 | 11/2018 | Boussand | |

(Continued)

FOREIGN PATENT DOCUMENTS

| | | |
|---|---|---|
| CN | 101155892 A | 4/2008 |
| FR | 3033791 A1 | 9/2016 |

(Continued)

OTHER PUBLICATIONS

"Earth's atmosphere", Concise Science Dictionary, Oxford University Press, 1984, p. 218. (Year: 1984).*
U.S. Appl. No. 16/027,743, Laurent Abbas and Wissam Rached, filed Jul. 5, 2018 (Cited herein as US Patent Application Publication No. 2019/0048241 A1 of Feb. 14, 2019).
U.S. Appl. No. 16/514,241, Wissam Rached, Sophie Guérin and Pascale Kindler, filed Jul. 17, 2019 (Cited herein as US Patent Application Publication No. 2019/0337874 A1 of Nov. 7, 2019).
Yamamoto, Hiroyasu, et al., "Compression Type Heat Pump", Application and Economy of Heat Pump, Technical Report, No. 52, Chapter 4, Feb. 27, 1984, pp. 117-134 (22 pages including Partial English-language translation).

(Continued)

*Primary Examiner* — Douglas J McGinty
(74) *Attorney, Agent, or Firm* — Buchanan Ingersoll & Rooney P.C.

(57) ABSTRACT

The invention relates to the use of a composition that comprises at least one hydrochlorofluoroolefin, at least one mineral oil, and air, with the air being provided in a weight concentration of less than 1%, relative to the mass of the mixture of said at least one hydrochlorofluoroolefin and air, said composition being exposed to a maximum change-of-state temperature greater than or equal to approximately 100° C.

17 Claims, No Drawings

(56) References Cited

U.S. PATENT DOCUMENTS

| | | |
|---|---|---|
| 10,125,296 B2 | 11/2018 | Rached |
| 10,131,829 B2 | 11/2018 | Deur-Bert et al. |
| 10,252,913 B2 | 4/2019 | Bonnet et al. |
| 10,316,231 B2 | 6/2019 | Rached |
| 10,358,592 B2 | 7/2019 | Rached |
| 10,377,935 B2 | 8/2019 | Guerin et al. |
| 10,399,918 B2 | 9/2019 | Rached |
| 10,450,488 B2 | 10/2019 | Boussand |
| 10,858,561 B2 | 12/2020 | Abbas et al. |
| 10,858,562 B2 | 12/2020 | Rached |
| 2006/0266976 A1 | 11/2006 | Minor et al. |
| 2008/0098755 A1 | 5/2008 | Singh et al. |
| 2009/0095014 A1 | 4/2009 | Sun et al. |
| 2009/0305876 A1 | 12/2009 | Singh et al. |
| 2010/0181524 A1 | 7/2010 | Elsheikh et al. |
| 2011/0037016 A1 | 2/2011 | Singh et al. |
| 2011/0084228 A1 | 4/2011 | Rached |
| 2011/0095224 A1 | 4/2011 | Rached |
| 2011/0186772 A1 | 8/2011 | Rached |
| 2011/0197602 A1 | 8/2011 | Abbas |
| 2011/0219791 A1 | 9/2011 | Rached |
| 2011/0219792 A1 | 9/2011 | Rached |
| 2011/0240254 A1 | 10/2011 | Rached |
| 2011/0284181 A1 | 11/2011 | Rached |
| 2012/0012591 A1 | 1/2012 | Bowman et al. |
| 2012/0049104 A1 | 3/2012 | Rached |
| 2012/0056123 A1 | 3/2012 | Rached |
| 2012/0068105 A1 | 3/2012 | Rached et al. |
| 2012/0117990 A1 | 5/2012 | Rached |
| 2012/0128964 A1 | 5/2012 | Hulse |
| 2012/0144857 A1 | 6/2012 | Rached |
| 2012/0151958 A1 | 6/2012 | Rached |
| 2012/0151959 A1 | 6/2012 | Rached |
| 2012/0153213 A1 | 6/2012 | Rached |
| 2012/0159982 A1 | 6/2012 | Rached |
| 2012/0161063 A1 | 6/2012 | Singh |
| 2012/0161064 A1 | 6/2012 | Rached |
| 2012/0167615 A1 | 7/2012 | Rached |
| 2012/0205574 A1 | 8/2012 | Rached et al. |
| 2012/0226081 A1 | 9/2012 | Elsheikh et al. |
| 2013/0004435 A1 | 1/2013 | Cook et al. |
| 2013/0092869 A1 | 4/2013 | Boussand |
| 2013/0105724 A1 | 5/2013 | Boussand |
| 2013/0186114 A1 | 7/2013 | Guerin et al. |
| 2014/0008565 A1 | 1/2014 | Rached et al. |
| 2014/0070129 A1* | 3/2014 | Kennoy .................. C11D 7/30 252/2 |
| 2014/0075969 A1 | 3/2014 | Guerin et al. |
| 2014/0318160 A1 | 10/2014 | Rached |
| 2014/0326017 A1 | 11/2014 | Rached |
| 2015/0027146 A1 | 1/2015 | Boussand |
| 2015/0034523 A1 | 2/2015 | Kopkalli et al. |
| 2015/0152306 A1 | 6/2015 | Rached |
| 2015/0152307 A1 | 6/2015 | Rached |
| 2015/0231527 A1 | 8/2015 | Singh |
| 2015/0322317 A1 | 11/2015 | Collier et al. |
| 2015/0322321 A1 | 11/2015 | Deur-Bert et al. |
| 2015/0344761 A1 | 12/2015 | Rached |
| 2015/0353799 A1 | 12/2015 | Deur-Bert et al. |
| 2015/0353802 A1 | 12/2015 | Rached |
| 2016/0009555 A1 | 1/2016 | Bonnet et al. |
| 2016/0009973 A1* | 1/2016 | Rached ................... C09K 3/00 424/47 |
| 2016/0023034 A1 | 1/2016 | Elsheikh et al. |
| 2016/0024363 A1 | 1/2016 | Rached |
| 2016/0025394 A1 | 1/2016 | Rached |
| 2016/0115361 A1 | 4/2016 | Boussand |
| 2016/0122609 A1 | 5/2016 | Rached |
| 2016/0194541 A1 | 7/2016 | Guerin et al. |
| 2016/0244652 A1 | 8/2016 | Rached |
| 2016/0257867 A1* | 9/2016 | Chen ...................... C09K 5/044 |
| 2016/0272561 A1* | 9/2016 | Rached .................. F01K 25/10 |
| 2016/0298014 A1 | 10/2016 | Rached |
| 2016/0355718 A1 | 12/2016 | Rached |
| 2016/0376484 A1 | 12/2016 | Guerin et al. |
| 2017/0037291 A1 | 2/2017 | Rached et al. |
| 2017/0080773 A1 | 3/2017 | Rached |
| 2017/0145276 A1 | 5/2017 | Rached |
| 2017/0210960 A1 | 7/2017 | Deur-Bert et al. |
| 2017/0210962 A1 | 7/2017 | Collier et al. |
| 2017/0218241 A1 | 8/2017 | Deur-Bert et al. |
| 2017/0218242 A1 | 8/2017 | Rached |
| 2018/0086173 A1 | 3/2018 | Rached |
| 2018/0134936 A1 | 5/2018 | Rached |
| 2018/0148395 A1 | 5/2018 | Rached et al. |
| 2018/0244970 A1 | 8/2018 | Rached |
| 2018/0282603 A1 | 10/2018 | Guerin et al. |
| 2018/0320560 A1 | 11/2018 | Rached |
| 2018/0327645 A1 | 11/2018 | Boussand |
| 2019/0016937 A1* | 1/2019 | Andre ..................... C09K 5/045 |
| 2019/0023957 A1 | 1/2019 | Rached |
| 2019/0040292 A1 | 2/2019 | Rached |
| 2019/0048241 A1* | 2/2019 | Abbas ..................... C09K 5/044 |
| 2019/0048518 A1 | 2/2019 | Wong et al. |
| 2019/0203094 A1 | 7/2019 | Rached |
| 2019/0249057 A1 | 8/2019 | Rached |
| 2019/0276721 A1 | 9/2019 | Rached |
| 2019/0284500 A1 | 9/2019 | Rached |
| 2019/0337874 A1 | 11/2019 | Rached et al. |
| 2019/0359870 A1 | 11/2019 | Rached |
| 2019/0367789 A1 | 12/2019 | Rached |
| 2020/0087555 A1* | 3/2020 | Rached .............. C10M 171/008 |
| 2020/0216734 A1* | 7/2020 | Rached .............. C10M 171/008 |
| 2020/0407613 A1 | 12/2020 | Rached |
| 2021/0017107 A1 | 1/2021 | Deur-Bert et al. |

FOREIGN PATENT DOCUMENTS

| | | |
|---|---|---|
| JP | S62-225860 A | 10/1987 |
| JP | H03-168566 A | 7/1991 |
| JP | H04-110388 A | 4/1992 |
| JP | H06-272978 A | 9/1994 |
| JP | 2011-510119 A | 7/1999 |
| JP | 2002-501035 A | 1/2002 |
| JP | 2008-524433 A | 7/2008 |
| WO | WO 99/37598 A1 | 7/1999 |
| WO | WO 02/40613 A1 | 5/2002 |
| WO | WO 2004/037913 A2 | 5/2004 |
| WO | WO 2004/037913 A3 | 5/2004 |
| WO | WO 2006/069362 A2 | 6/2006 |
| WO | WO 2006/069362 A3 | 6/2006 |
| WO | WO 2007/002625 A2 | 1/2007 |
| WO | WO 2007/002625 A3 | 1/2007 |
| WO | WO 2009/003165 A1 | 12/2008 |
| WO | WO 2009/140231 A2 | 11/2009 |
| WO | WO 2010/043807 A1 | 4/2010 |
| WO | WO 2014/158663 A1 | 10/2014 |

OTHER PUBLICATIONS

Zheng, Zuyi, *Application of Heat Pump Technology in Air Conditioning*, China Mechanical Press, 1st edition, Jul. 1998, five pages including p. 9, title page, publisher information, and English-language translation of p. 9.

Xiuling Yuan, Editor, *Refrigeration and Air-Conditioning Apparatus*, Xi'an Jiaotong University Press, 1st edition, Mar. 2001, four pages including p. 37. title page, publisher information, and English-language translation of p. 37.

International Search Report (PCT/ISA/210) and translation and Written Opinion (PCT/ISA/237) dated Jan. 28, 2019, by the European Patent Office as the International Searching Authority for International Application No. PCT/FR2018/052188.

* cited by examiner

COMPOSITION ON THE BASIS OF HYDROCHLOROFLUOROOLEFIN AND MINERAL OIL

FIELD OF THE INVENTION

The present invention relates to compositions comprising a hydrochlorofluoroolefin, a mineral oil and air, which are stable and suitable for use as heat-transfer compositions.

TECHNICAL BACKGROUND

Hydrochlorofluoroolefins are products with a low global warming potential (GWP). For example, trans-1-chloro-3,3,3-trifluoropropene (HCFO-1233zd) has very favorable thermodynamic and thermophysical properties for use as a heat-transfer fluid in cooling, air-conditioning and air-conditioner (in particular in centrifugal compressors), electricity production (in particular by means of organic Rankine cycles) and high-temperature heat pump applications.

In air-conditioner applications, the pressure of HCFO-1233zdE in the evaporator is often lower than atmospheric pressure, which promotes the infiltration of air, and in particular oxygen, into the facility. In heat pumps, air infiltrations can occur when the system is stopped. There can also be air infiltrations in any facility using a heat-transfer fluid during filling or maintenance of said facility. The presence of air mixed with HCFO-1233zdE promotes the HCFO-1233zdE isomerization reaction and therefore the formation of the HCFO-1233zdZ isomer (cis-1-chloro-3,3,3-trifluoropropene). This cis isomer has thermodynamic properties very different than those of HCFO-1233zdE, something which has a negative impact on the performance qualities of facilities.

In order to prevent the isomerization of HCFO-1233zdE to HCFO-1233zdZ, stabilizers can be added to HCFO-1233zdE.

For example, document FR 3033791 describes the use of an alkene compound, in particular 2-methylbut-2-ene and 3-methylbut-1-ene, to prevent the isomerization of trans-1-chloro-3,3,3-trifluoropropene to cis-1-chloro-3,3,3-trifluoropropene.

In the industrial field, the most commonly used refrigerant machines are based on cooling by evaporation of a liquid refrigerant fluid. After vaporization, the fluid is compressed then condensed and finally expanded to complete the cycle.

The refrigeration compressors used can be of the reciprocating, scroll, centrifugal or screw type. In general, internal lubrication of the compressors is essential in order to reduce wear and heating of the moving members, complete their leaktightness and protect them against corrosion.

As a lubricant, use may be made of a mineral oil, which is less expensive than oxygenated oils such as polyol esters.

Document U.S. Pat. No. 8,454,853 describes the miscibility of 1-chloro-3,3,3-trifluoropropene with mineral oils and the use of the corresponding mixtures as refrigerant compositions.

In refrigeration facilities, the oil is in direct contact with the refrigerant (for example hydrochlorofluoroolefin) at the compressor and throughout the facility. The refrigerant/oil combination must be stable regardless of the heat stresses in the facility, and also in the presence of impurities, infiltrated air and moisture.

The oil must ensure the lubrication of the compressor bearings regardless of the conditions under which the compressor is used. In this regard, the viscosity of the refrigerant/oil mixture is an indicator of lubrication performance quality. The refrigerant dissolves in the oil and reduces its viscosity. Thus, to select an oil, solubility and viscosity measurements on the oil/refrigerant pair are carried out to determine the variation in viscosity of the mixture as a function of the conditions of use. These measurements make it possible to choose the optimal oil viscosity grade to be used according to the operating temperatures.

However, if during the operation of the facility, there is degradation of the compounds and formation of new products, the solubility and viscosity measurements are no longer valid. The oil may then lose its lubrication role. Thus, if there is isomerization or decomposition of the refrigerant or of the oil, the performance qualities of the facility may be degraded, as may those of the lubricant due to the variation in the viscosity outside the predefined ranges. For example, oil degradation and the resulting formation of small particles are harmful to the compressor.

There is therefore a real need to provide a low-GWP refrigerant/lubricating oil mixture, which is economical and stable over time, in particular stable at high temperatures.

SUMMARY OF THE INVENTION

The invention relates firstly to a composition comprising at least one hydrochlorofluoroolefin, at least one mineral oil and air, the air being in a weight proportion of less than 1% relative to the weight of the mixture of the at least one hydrochlorofluoroolefin and air.

According to one embodiment, the composition does not comprise any stabilizer.

According to one embodiment, the composition essentially consists, and preferably consists, of at least one hydrochlorofluoroolefin, at least one mineral oil and air, the air being in a weight proportion of 0% excluded to 1 excluded relative to the weight of the mixture of the at least one hydrochlorofluoroolefin and air.

According to one embodiment, the weight proportion of air in the composition is from 0.05% to 1% excluded, preferably from 0.1% to 1% excluded, even more preferentially from 0.2% to 1% excluded, relative to the weight of the mixture of the at least one hydrochlorofluoroolefin and air.

According to one embodiment, the weight proportion of air in the composition is from 0% excluded to 0.6% included, preferably from 0% excluded to 0.4% included, relative to the weight of the mixture of the at least one hydrochlorofluoroolefine and air.

According to one embodiment, the weight proportion of air in the composition is from 0.05% included to 0.4% included, preferably from 0.1% included to 0.4% included, relative to the weight of the mixture of the at least one hydrochlorofluoroolefin and air.

According to one embodiment, the at least one hydrochlorofluoroolefin is chosen from 1-chloro-3,3,3-trifluoropropene, in particular trans-1-chloro-3,3,3-trifluoropropene, 2-chloro-3,3,3-trifluoropropene, 3,3,3,2-tetrafluorochloro-1-propene, a dichlorotrifluoropropene or a combination thereof.

According to one embodiment, the at least one hydrochlorofluoroolefin is 1-chloro-3,3,3-trifluoropropene.

According to one embodiment, the 1-chloro-3,3,3-trifluoropropene is in trans form in a weight proportion greater than or equal to 90%, preferably greater than or equal to 95%, more particularly preferably greater than or equal to 98%, even more preferably greater than or equal to 99%, even more preferably greater than or equal to 99.5%, or even greater than or equal to 99.9%, relative to the total weight of 1-chloro-3,3,3-trifluoropropene.

According to one embodiment, the mineral oil is in a weight proportion of 2% to 70% relative to the total weight of the composition.

The invention also relates to the use for the heat transfer of a composition as described above wherein the composition is subjected to at least one change of state at a mean temperature greater than or equal to approximately 100° C.

According to one embodiment, the composition is subjected to at least one change of state at a mean temperature of approximately 100° C. to approximately 200° C.

According to one embodiment, the invention relates to a use as described above in a vapor-compression system or in a machine for producing mechanical or electrical energy and preferably for producing electricity.

According to one embodiment, the vapor-compression system is an air-conditioning system, a refrigeration system, a freezing system, or a heat pump system.

The invention also relates to a facility comprising a circuit containing a composition as described above as a heat-transfer composition.

According to one embodiment, the facility is chosen from mobile or stationary facilities for heating by heat pump, air-conditioning facilities, refrigeration facilities, freezing facilities and machines for producing mechanical or electrical energy, preferably for producing electricity.

The invention also relates to a process for heating or cooling a fluid or a body by means of a vapor-compression system containing a heat-transfer composition, said process successively comprising evaporation of the heat-transfer composition, compression of the heat-transfer composition, condensation of the heat-transfer composition and expansion of the heat-transfer composition, wherein the heat-transfer composition is a composition as described above.

The invention also relates to a process for producing mechanical or electrical energy, and preferably for producing electricity, by means of a machine comprising a circuit containing a heat-transfer composition, said process successively comprising evaporation of the heat-transfer composition, expansion of the heat-transfer composition in a turbine making it possible to generate mechanical or electrical energy, and preferably electricity, condensation of the heat-transfer composition and compression of the heat-transfer composition, wherein the heat-transfer composition is a composition as described.

The present invention makes it possible to satisfy the need expressed above. It more particularly provides compositions comprising a hydrochlorofluoroolefin, a mineral oil and air having good heat stability, including at temperatures between 100° C. and 200° C., and over a significant period.

This is accomplished by virtue both of the use of a mineral oil which reduces or even prevents the degradation, and in particular the isomerization, of the hydrochlorofluoroolefin, and of the presence of air in a specific weight proportion range making it possible to limit or even prevent the degradation of the mineral oil.

According to certain particular embodiments, the invention also exhibits one or, preferably, more of the advantageous features listed below:
- the compositions according to the invention can be stored and used without adding stabilizer;
- they are less complex and therefore less expensive to produce than compositions containing an oxygen-bearing synthetic oil;
- they can be used in existing facilities already operating with mineral oil as a lubricant.

DESCRIPTION OF EMBODIMENTS OF THE INVENTION

The invention is now described in more detail and in a nonlimiting manner in the description which follows.

In the context of the invention, "HCFO-1233zd" refers to 1-chloro-3,3,3-trifluoropropene, regardless of whether this is the cis or trans form. The terms "HCFO-1233zdZ" and "HCFO-1233zdE" refer to the cis and trans forms, respectively, of 1-chloro-3,3,3-trifluoropropene. The term "HCFO-1233zd" therefore covers HCFO-1233zdZ, HCFO-1233zdE, and all the mixtures of the two isomeric forms in any proportions.

The air contains approximately 78 vol. % of dinitrogen and approximately 21 vol. % of oxygen, and also various other constituents in a content of less than 1 vol. %, including in particular argon and carbon dioxide. The above contents are given with reference to dry air. In addition, the air may contain water vapor in a content relative to the total air which can typically range from 0.001 vol. % to 5 vol. %.

Unless otherwise mentioned, throughout the patent application, the proportions of compounds shown are given as percentages by weight.

Unless otherwise indicated, throughout the patent application, the limits of the ranges are included in said range.

Hydrochlorofluoroolefin

The invention uses at least one hydrochlorofluoroolefin.

The term "hydrochlorofluoroolefin" is intended to mean an unsaturated hydrocarbon compound substituted with one or more chlorine atoms and with one or more fluorine atoms, in the knowledge that at least one hydrogen atom is unsubstituted.

Advantageously, the hydrochlorofluoroolefin is 1-chloro-3,3,3-trifluoropropene, 2-chloro-3,3,3-trifluoropropene, 3,3,3,2-tetrafluorochloro-1-propene, a dichlorotrifluoropropene or a combination thereof.

Preferably, the hydrochlorofluoroolefin is 1-chloro-3,3,3-trifluoropropene.

When the hydrochlorofluoroolefin is 1-chloro-3,3,3-trifluoropropene, it may be trans-1-chloro-3,3,3-trifluoropropene, cis-1-chloro-3,3,3-trifluoropropene or a mixture thereof.

According to one advantageous embodiment, the hydrochlorofluoroolefin is 1-chloro-3,3,3-trifluoropropene, the latter being in trans form in a weight proportion greater than or equal to 90%, preferably greater than or equal to 95%, more particularly preferably greater than or equal to 98%, even more preferably greater than or equal to 99%, even more preferably greater than or equal to 99.5%, or even greater than or equal to 99.9%, relative the total weight of 1-chloro-3,3,3-trifluoropropene (i.e. relative to the sum of trans-1-chloro-3,3,3-trifluoropropene and cis-1-chloro-3,3,3-trifluoropropene).

Mineral Oil

The invention also uses a mineral oil.

Preferably, this mineral oil is a by-product from the refining of petroleum.

The mineral oils can comprise paraffins (i.e. linear or branched saturated hydrocarbons), naphthenes (i.e. cyclic paraffins), aromatic compounds (i.e. cyclic unsaturated hydrocarbons containing one or more rings characterized by double bonds alternating with single bonds) and non-hydrocarbon compounds.

These mineral oil compounds are not necessarily present in the oil in the free state. It is common for a paraffin chain to be attached to a naphthenic or aromatic structure. Likewise, a naphthenic ring to which a paraffin chain is attached can in turn be attached to an aromatic structure.

Because of these properties, a mineral oil is often described by a carbon type analysis. In this analysis, the number of carbon atoms in the paraffin chains, naphthenic structures and aromatic rings is determined and represented as a percentage of the total. Thus, the percentage of carbon atoms having a paraffinic configuration, % $C_P$, includes not only the free paraffins but also the paraffin chains attached to the naphthenic or aromatic rings. Likewise, the percentage of carbon atoms in naphthenic structures, % $C_N$, includes the carbon atoms of the free naphthenes and also those of the naphthenic rings attached to the aromatic rings, and % CA represents the carbon of the aromatic rings. Carbon analysis makes it possible to describe a lubricant (or oil) in its fundamental structure and to predict a certain number of physical properties of the lubricant.

The traditional classification of mineral oils as paraffinic or naphthenic oils refers to the number of paraffin or naphthene molecules in the oil. Paraffinic oils contain a higher proportion of paraffin wax, and thus have a higher viscosity index and pour point than naphthenic oils.

According to one advantageous embodiment, the mineral oils used in the invention have a mean kinematic viscosity ranging from 1 to 1000 cSt (centistokes) at 40° C., preferably from 10 to 300 cSt, measured according to ISO standard 3104. ISO 3448 standard establishes a classification system for industrial liquid lubricants according to their viscosity.

According to one particular embodiment, the mineral oil is a naphthenic oil, with % $C_p$ preferably less than 50%. Advantageously, the naphthenic rings of the naphthenic fraction of the oil are in the main $C_5$ to $C_7$ naphthenic rings.

Compositions

The invention relates to a composition comprising at least one hydrochlorofluoroolefin, at least one mineral oil and air. According to the invention, the air is present in the composition in a weight proportion of 0% excluded to 1% excluded relative to the mass of the mixture of the at least one hydrochlorofluoroolefin and air.

This proportion of air is understood to mean the composition in use, that is to say for example in the circuit in which it circulates.

In certain embodiments, only one hydrochlorofluoroolefin is present in the composition, preferably as described above. Thus, preferably, the composition comprises only HCFO-1233zd (predominantly in trans form, as described above) as hydrochlorofluoroolefin (with the possible exception of other hydrochlorofluoroolefins present as impurities in a total weight content of less than or equal to 1%, or less than or equal to 0.5%, or less than or equal to 0.1%, relative to the total of the composition).

Alternatively, mixtures of different hydrochlorofluoroolefins can be used in the composition.

Advantageously, the composition according to the invention does not contain any stabilizer other than mineral oil.

The term "stabilizer" is intended to mean any compounds which make it possible to limit or eliminate the degradation of one of the constituents of the composition, in particular of the hydrochlorofluoroolefin or the mineral oil, for example limiting or eliminating the isomerization of the hydrochlorofluoroolefin.

According to one embodiment, the composition essentially consists of at least one hydrochlorofluoroolefin, at least one mineral oil and air in a weight proportion of 0% excluded to 1% excluded relative to the weight of the mixture of the at least one hydrochlorofluoroolefin and air.

According to another embodiment, the composition consists of at least one hydrochlorofluoroolefin, at least one mineral oil and air in a weight proportion of 0% excluded to 1% excluded relative to the weight of the mixture of the at least one hydrochlorofluoroolefin and air.

According to certain advantageous embodiments, the air in the composition is in a weight proportion, relative to the weight of the mixture of the at least one hydrochlorofluoroolefin and air, from 0.05% to 1% excluded, preferably from 0.1% to 1% excluded, even more preferentially from 0.2% to 1% excluded. According to other advantageous embodiments, the air in the composition is in a weight proportion, relative to the weight of the mixture of the at least one hydrochlorofluoroolefin and air, from 0% excluded to 0.6% included, in particular from 0% excluded to 0.4% included, in particular from 0.05% included to 0.4% included, and preferably from 0.1% included to 0.4% included. In other embodiments, the air is present in the composition in a weight proportion of 0% excluded to 0.05% included, or from 0.05% included to 0.1% included, or from 0.1% included to 0.15% included, or from 0.15% included to 0.2% included, or from 0.2% included to 0.25% included, or from 0.25% included to 0.3% included, or from 0.3% included to 0.35% included, or from 0.35% included to 0.4% included, or from 0.4% included to 0.45% included, or from 0.45% included to 0.5% included, or from 0.5% included to 0.55% included, or from 0.55% included to 0.6% included, or from 0.6% included to 0.7% included, or from 0.7% included to 0.8% included, or from 0.8% included to 0.9% included, or from 0.9% included to 1% excluded, relative to the weight of the mixture of the at least one hydrochlorofluoroolefin and air. The weight proportion of air is determined by gas chromatography. The measurement of the weight proportion of air of a composition circulating in a facility in operation can be carried out by taking a sample of the gas phase of the composition in the facility, then analyzing the sample by gas chromatography.

According to one embodiment, in the composition, the mineral oil is in a weight proportion of 2% to 70% relative to the total weight of the composition. According to other embodiments, the mineral oil is in a weight proportion of from 1 to 5%, or from 5 to 10%, or from 10 to 15%, or from 15 to 20%, or from 20 to 25%, or from 25 to 30%, or from 30 to 35%, or from 35 to 40%, or from 40 to 45%, or from 45 to 50%, or from 50 to 55%, or from 55 to 60%, from 60 to 65%, from 65 to 70%, from 70 to 75%, from 75 to 80%, or from 80 to 85%, or from 85 to 90%, or from 90 to 95%, or from 95 to 99%, relative to the total weight of the composition.

The weight proportion of the hydrochlorofluoroolefin(s) can be from 1 to 5%, or from 5 to 10%, or from 10 to 15%, or from 15 to 20%, or from 20 to 25%, or from 25 to 30%, or from 30 to 35%, or from 35 to 40%, or from 40 to 45%, or from 45 to 50%, or from 50 to 55%, or from 55 to 60%, or from 60 to 65%, or from 65 to 70%, or from 70 to 75%, or from 75 to 80%, or from 80 to 85%, or from 85 to 90%, or from 90 to 95%, or from 95 to 99%, relative to the total of the composition.

In embodiments, the composition also comprises at least one additive, preferably chosen from nanoparticles, surfactants, tracer agents, fluorescent agents, odorous agents and solubilizing agents.

According to a particular embodiment, the composition essentially consists, preferably consists, of at least one hydrochlorofluoroolefin, at least one mineral oil, air and one or more additives chosen from nanoparticles, surfactants, tracer agents, fluorescent agents, odorous agents and solubilizing agents, the air being in a weight proportion of 0% excluded to 1% excluded relative to the weight of the mixture of the at least one hydrochlorofluoroolefin and air.

As nanoparticles, use may in particular be made of carbon nanoparticles, metal oxides, preferably copper or aluminum oxides, titanium dioxide TiO2, alumina $Al_2O_3$, molybdenum disulfide $MoS_2$ or combinations thereof.

As tracer agents (capable of being detected), mention may be made of deuterated or non-deuterated hydrofluorocarbons, deuterated hydrocarbons, perfluorocarbons, fluoroethers, brominated compounds, iodinated compounds, alcohols, aldehydes, ketones, nitrous oxide and combinations thereof. The tracer agent is different than the hydrochlorofluoroolefin(s) of the invention.

As solubilizing agents, mention may be made of hydrocarbons, dimethyl ether, polyoxyalkylene ethers, amides, ketones, nitriles, chlorocarbons, esters, lactones, aryl ethers, fluoroethers and 1,1,1-trifluoroalkanes. The solubilizing agent is different than the hydrochlorofluoroolefin(s) of the invention.

As fluorescent agents, mention may be made of naphthalimides, perylenes, coumarins, anthracenes, phenanthracenes, xanthenes, thioxanthenes, naphthoxanthenes, fluoresceins and derivatives and combinations thereof.

As odorous agents, mention may be made of alkyl acrylates, allyl acrylates, acrylic acids, acryl esters, alkyl ethers, alkyl esters, alkynes, aldehydes, thiols, thioethers, disulfides, allyl isothiocyanates, alkanoic acids, amines, norbornenes, norbornene derivatives, cyclohexene, aromatic heterocyclic compounds, ascaridole, o-methoxy(methyl) phenol and the combinations thereof.

Uses

A subject of the invention is the use for heat transfer of a composition as described above wherein the composition is subjected to at least one change of state at a mean temperature greater than or equal to 100° C., preferably at a mean temperature of approximately 100° C. to approximately 200° C. According to particular embodiments, the composition is subjected to at least one change of state at a mean temperature of approximately 100° C. to approximately 110° C., or of approximately 110° C. to approximately 120° C., or of approximately 120° C. to approximately 130° C., or of approximately 130° C. to approximately 140° C., or of approximately 140° C. to approximately 150° C., or of approximately 150° C. to approximately 160° C., or of approximately 160° C. to approximately 170° C., or of approximately 170° C. to approximately 180° C., or of approximately 180° C. to approximately 200° C.

The term "change of state" is intended to mean either a condensation, that is to say the passage of the composition from the gaseous state to the liquid state, or an evaporation, that is to say the passage of the composition from the liquid state to the gaseous state.

The term "mean change-of-state temperature" is intended to mean the temperature of the change of state if this temperature is constant or, if the temperature of change of state is not constant, the arithmetic mean of the temperature at the start of the change of state and the temperature at the end of the change of state.

According to one embodiment, the composition is used in a vapor-compression system.

The present invention also relates to a heat-transfer process based on the use of a facility comprising a vapor-compression system which contains the composition of the invention as heat-transfer composition. The heat-transfer process may be a process for heating or cooling a fluid or a body.

The term "heat-transfer composition" refers to a composition comprising a heat-transfer fluid and optionally one or more additives which are not heat-transfer compounds for the application envisaged.

The term "heat-transfer fluid" is intended to mean a fluid capable of absorbing heat by evaporating at low temperature and low pressure and of releasing heat by condensing at high temperature and high pressure, in a vapor-compression circuit. Generally, a heat-transfer fluid may comprise just one, two, three or more than three heat-transfer compounds.

The term "heat-transfer compound" is intended to mean a compound capable of absorbing heat by evaporating at low temperature and low pressure and of releasing heat by condensing at high temperature and high pressure, in a vapor-compression circuit.

According to one embodiment, the vapor-compression system is:
an air-conditioning system; or
a refrigeration system; or
a freezing system; or
a heat pump system.

According to another embodiment, the composition is used in a machine for producing mechanical or electrical energy. The composition of the invention may thus be used in a process for producing mechanical work or electricity, in particular in accordance with an organic Rankine cycle.

It has been discovered that the higher the mean change-of-state temperature to which the composition is subjected, the lower the maximum threshold of admissible amount of air. Thus, it is advisable to further limit the presence of air in the composition when the mean temperature of at least one change of state of the composition during its use is relatively high.

Facilities and Processes

A subject of the invention is also a heat-transfer facility comprising a circuit containing a composition as described above as heat-transfer composition. The circuit comprising the heat-transfer composition is for example a vapor-compression circuit.

According to one embodiment, this facility is chosen from mobile or stationary refrigeration, heating (heat pump), air-conditioning and freezing facilities, and machines for producing mechanical or electrical energy.

It may in particular be a heat pump facility, in which case the fluid or body which is heated (generally air and optionally one or more products, objects or organisms) is located in a room or a vehicle passenger compartment (for a mobile facility). According to a preferred embodiment, it is an air-conditioning facility, in which case the fluid or body which is cooled (generally air and optionally one or more products, objects or organisms) is located in a room or a vehicle passenger compartment (for a mobile facility). It may be a refrigeration facility or a freezing facility (or cryogenic facility), in which case the fluid or body which is cooled generally comprises air and one or more products, objects or organisms located in a room or a container.

Another subject of the invention is a process for heating or cooling a fluid or a body by means of a vapor-compression system containing a heat-transfer composition as described above, said process comprising successively evaporation of the heat-transfer composition, compression of the heat-transfer composition, condensation of the heat-transfer composition and expansion of the heat-transfer composition.

Another subject of the invention is a process for producing mechanical work, or preferably for producing electricity, by means of a machine comprising a circuit which contains a heat-transfer composition as described above, said process successively comprising evaporation of the heat-transfer composition, expansion of the heat-transfer composition in a turbine making it possible to generate mechanical or electrical energy, and preferably electricity, condensation of the heat-transfer composition and compression of the heat-transfer composition.

The vapor-compression circuit containing a heat-transfer composition comprises at least one evaporator, one compressor, one condenser and one expander, and also lines for transporting heat-transfer fluid between these elements. The evaporator and the condenser comprise a heat exchanger which allows heat exchange between the heat-transfer composition and another fluid or body.

As compressor, use may in particular be made of a single-stage or multistage centrifugal compressor or of a mini centrifugal compressor. Rotary, reciprocating or screw compressors may also be used. The compressor may be driven by an electric motor or by a gas turbine (for example fed by the exhaust gases of a vehicle, for mobile applications) or by gearing.

A centrifugal compressor is characterized in that it uses rotating elements to radially accelerate the heat-transfer composition; it typically comprises at least one rotor and a diffuser housed in a chamber. The heat-transfer composition is introduced into the center of the rotor and circulates towards the periphery of the rotor while undergoing acceleration. Thus, on the one hand, the static pressure increases in the rotor and above all, on the other hand, at the diffuser, the velocity is converted into an increase in the static pressure. Each rotor/diffuser assembly constitutes a stage of the compressor. Centrifugal compressors can comprise from 1 to 12 stages, according to the desired final pressure and the volume of fluid to be treated.

The degree of compression is defined as the ratio of the absolute pressure of the heat-transfer composition at the outlet to the absolute pressure of said composition at the inlet.

The rotational speed for large centrifugal compressors ranges from 3000 to 7000 revolutions per minute. Small centrifugal compressors (or mini centrifugal compressors) generally operate at a rotational speed which ranges from 40 000 to 70 000 revolutions per minute and include a small-sized rotor (generally less than 0.15 m).

Use may be made of a multistage rotor in order to improve the efficiency of the compressor and to limit the energy cost (in comparison with a single-stage rotor). For a two-stage system, the outlet of the first stage of the rotor feeds the inlet of the second rotor. The two rotors can be mounted on a single shaft. Each stage can provide a compression ratio of the fluid of approximately 4 to 1, that is to say that the absolute outlet pressure can be equal to approximately four times the absolute suction pressure. Examples of two-stage centrifugal compressors, in particular for motor vehicle applications, are described in the documents U.S. Pat. Nos. 5,065,990 and 5,363,674.

The centrifugal compressor can be driven by an electric motor or by a gas turbine (for example fed by the exhaust gases of a vehicle, for mobile applications) or by gearing.

The facility may comprise a coupling of the expansion valve with a turbine in order to generate electricity (Rankine cycle).

The facility may also optionally comprise at least one heat-transfer fluid circuit used to transmit the heat (with or without change of state) between the heat-transfer composition circuit and the fluid or body to be heated or cooled.

The facility may also optionally comprise two (or more) vapor-compression circuits containing identical or distinct heat-transfer compositions. For example, the vapor-compression circuits may be coupled to each other.

The vapor-compression circuit operates according to a conventional cycle of vapor-compression. The cycle comprises the change of state of the heat-transfer composition from a liquid phase (or liquid/vapor dual phase) to a vapor phase at a relatively low pressure, then the compression of the composition in vapor phase until a relatively high pressure is reached, the change of state (condensation) of the heat-transfer composition from the vapor phase to the liquid phase at a relatively high pressure, and the reduction of the pressure so as to recommence the cycle.

In the case of a cooling process, heat originating from the fluid or from the body that is being cooled (directly or indirectly, via a heat-transfer fluid) is absorbed by the heat-transfer composition during the evaporation of the latter, at a relatively low temperature compared to the surroundings. Cooling processes comprise air-conditioning processes (with mobile facilities, for example in vehicles, or stationary facilities), refrigeration processes and freezing processes or cryogenics processes.

In the case of a heating process, heat is transferred (directly or indirectly, via a heat-transfer fluid) from the heat-transfer composition, during the condensation thereof, to the fluid or body that is being heated, at a relatively high temperature compared to the surroundings. The facility for carrying out the heat transfer is, in this case, referred to as a "heat pump".

Use may be made of any type of heat exchanger for the implementation of the heat-transfer compositions according to the invention, and especially cocurrent heat exchangers, or preferably countercurrent heat exchangers.

According to a preferred embodiment, the invention provides that the cooling and heating processes and the corresponding facilities comprise a heat exchanger which is countercurrent with respect either to the condenser, or to the evaporator. Indeed, the heat-transfer compositions according to the invention are particularly effective with countercurrent heat exchangers. Preferably, both the evaporator and the condenser comprise a countercurrent heat exchanger.

According to the invention, the term "countercurrent heat exchanger" is intended to mean a heat exchanger in which heat is exchanged between a first fluid and a second fluid, the first fluid at the inlet of the exchanger exchanging heat with the second fluid at the outlet of the exchanger, and the first fluid at the outlet of the exchanger exchanging heat with the second fluid at the inlet of the exchanger.

For example, countercurrent heat exchangers include devices in which the flow of the first fluid and the flow of the second fluid are in opposite directions or virtually opposite directions. Exchangers operating in crosscurrent mode with a countercurrent tendency are also included among the countercurrent heat exchangers for the purposes of the present patent application.

In "low-temperature refrigeration" processes, the inlet temperature of the heat-transfer composition at the evaporator is preferably from −45° C. to −15° C., especially from −40° C. to −20° C., more particularly preferably from −35° C. to −25° C. and for example around −30° C.; and the temperature at the beginning of the condensation of the heat-transfer composition at the condenser is preferably from 25° C. to 80° C., especially from 30° C. to 60° C., more particularly preferably from 35° C. to 55° C. and for example around 40° C. In "moderate-temperature refrigeration" processes, the inlet temperature of the heat-transfer composition at the evaporator is preferably from −20° C. to 10° C., especially from −15° C. to 5° C., more particularly preferably from −10° C. to 0° C. and for example around −5° C.; and the temperature at the beginning of the condensation of the heat-transfer composition at the condenser is preferably from 25° C. to 80° C., especially from 30° C. to 60° C., more particularly preferably from 35° C. to 55° C. and for example around 50° C. These processes may be refrigeration or air-conditioning processes.

In "moderate-temperature heating" processes, the inlet temperature of the heat-transfer composition at the evaporator is preferably from −20° C. to 10° C., especially from −15° C. to 5° C., more particularly preferably from −10° C. to 0° C. and for example around −5° C.; and the temperature at the beginning of the condensation of the heat-transfer composition at the condenser is preferably from 25° C. to 80° C., especially from 30° C. to 60° C., more particularly preferably from 35° C. to 55° C. and for example around 50° C.

In "high-temperature heating" processes, the inlet temperature of the heat-transfer composition at the evaporator is preferably from −20° C. to 90° C., especially from 10° C. to 90° C., more particularly preferably from 50° C. to 90° C. and for example around 80° C.; and the temperature at the beginning of the condensation of the heat-transfer composition at the condenser is preferably from 70° C. to 160° C., especially from 90° C. to 150° C., more particularly preferably from 110° C. to 140° C. and for example around 135° C.

The compositions according to the invention are particularly advantageous in refrigerated transport.

"Refrigerated transport" is considered to be any movement of perishable products contained inside a refrigerated space. Food or pharmaceutical products represent a large portion of perishable products.

Refrigerated transport may be carried out by truck, railroad or ship, optionally with the aid of intermodal containers that are equally compatible with trucks, railroads or ships.

In refrigerated transport, the temperature of the refrigerated spaces is between −30° C. and 16° C. The refrigerant charge in transport by truck, railroad or intermodal containers varies between 4 kg and 8 kg of refrigerant. Facilities in boats can contain between 100 and 500 kg of refrigerant.

The most widely used refrigerant at the current time for this purpose is R404A.

The operating temperatures of the refrigerating facilities are a function of the refrigeration temperature requirements and outside climatic conditions. The same refrigerating facility must be capable of covering a wide temperature range between −30° C. and 16° C. and operating both in cold and hot climates.

The most restrictive condition in terms of evaporation temperature is −30° C.

EXAMPLES

The following examples illustrate the invention without limiting it.

Example 1

The heat stability of various compositions was tested. These heat stability tests are carried out according to the ASHRAE 97-2007 standard entitled "*Sealed glass tube method to test the chemical stability of materials for use within refrigerant systems*".

The compositions were prepared as follows.

All the tubes are loaded under vacuum with the following amounts: 5 g of Suniso 3GS oil and 2 g of HCFO-1233zdE.

Air is added at the end according to the following compositions, in weight percentage relative to the HCFO-1233zdE and air mixture.

| Composition No. | 1 | 2 | 3 |
|---|---|---|---|
| air (% by weight) | 0.2 | 0.4 | 1 |

Immediately after they have been prepared, the compositions exhibit a coloration which corresponds to the original oil color.

The various compositions were left for 14 days at 180° C.

A color analysis by spectrocolorimetry of the compositions according to the Gardner color scale was then carried out, according to the ISO 4630: 2015 standard.

The intensity of the color observed is proportional to the degradation of the oil. Indeed, this degradation also causes the formation of black particles with a percentage by weight of air greater than or equal to 1%.

The results are summarized in the table below:

| Composition No. | 1 | 2 | 3 |
|---|---|---|---|
| air (% by weight) | 0.2 | 0.4 | 1 |
| Color according to Gardner color scale | Dark yellow | Orange | Brown |

Gardner scale:
Gardner 1: very pale yellow;
Gardner 2 to 5: pale yellow;
Gardner 6 to 10: dark yellow;
Gardner 11 to 14: orange;
Gardner 15 to 17: very dark orange/light brown;
Gardner 18: brown.

It is found that during use at 180° C., the compositions comprising HCFO-1233zd, mineral oil and 0.2 or 0.4% by weight of air are stable, the degradation of the oil being low.

By contrast, when the weight percentage of air is greater than or equal to 1%, the oil degrades relatively significantly at a temperature of 180° C.

The invention claimed is:

1. A method of conducting heat transfer with a composition comprising at least one hydrochlorofluoroolefin, at least one mineral oil and air, the air being in a weight proportion of less than 1% relative to the weight of the mixture of the at least one hydrochlorofluoroolefin and air, wherein the method comprises subjecting the composition to at least one change of state at a mean temperature greater than or equal to approximately 100° C., and wherein the mineral oil is present in a weight proportion of from 10% to 70% relative to the total weight of the composition.

2. The method as claimed in claim 1, wherein the composition is subjected to at least one change of state at a mean temperature of approximately 100° C. to approximately 200° C.

3. The method as claimed in claim 1, wherein the composition does not comprise a stabilizer.

4. The method as claimed in claim 1, wherein the composition consists essentially of at least one hydrochlorofluoroolefin, at least one mineral oil and air, the air being in a weight proportion of >0% to <1% relative to the weight of the mixture of the at least one hydrochlorofluoroolefin and air.

5. The method as claimed in claim 1, wherein the weight proportion of air in the composition is from ≥0.05% to <1%, relative to the weight of the mixture of the at least one hydrochlorofluoroolefin and air.

6. The method as claimed in claim 1, wherein the weight proportion of air in the composition is from >0% to ≤0.6%, relative to the weight of the mixture of the at least one hydrochlorofluoroolefin and air.

7. The method as claimed in claim 1, wherein the weight proportion of air in the composition is from ≥0.05% to ≤0.4%, relative to the weight of the mixture of the at least one hydrochlorofluoroolefin and air.

8. The method as claimed in claim 1, wherein the at least one hydrochlorofluoroolefin is chosen from 1-chloro-3,3,3-trifluoropropene, 2-chloro-3,3,3-trifluoropropene, 3,3,3,2-tetrafluorochloro-1-propene, a dichlorotrifluoropropene or a combination thereof.

9. The method as claimed claim 1, wherein the at least one hydrochlorofluoroolefin is 1-chloro-3,3,3-trifluoropropene.

10. The method as claimed in claim 9, wherein the 1-chloro-3,3,3-trifluoropropene is in trans form in a weight proportion greater than or equal to 90%, relative to the total weight of 1-chloro-3,3,3-trifluoropropene.

11. The method as claimed in claim 1, wherein the composition is subjected to at least one change of state at a mean temperature equal to approximately 200° C.

12. The method as claimed in claim 1, wherein the method is performed in a vapor-compression system or in a machine for producing mechanical or electrical energy.

13. The method as claimed in claim 12, wherein the vapor-compression system is an air-conditioning system, a refrigeration system, a freezing system, or a heat pump system.

14. The method as claimed in claim 2, wherein the composition is subjected to at least one change of state at a mean temperature greater than or equal to approximately 120° C.

15. The method as claimed in claim 2, wherein the composition is subjected to at least one change of state at a mean temperature greater than or equal to approximately 140° C.

16. The method as claimed in claim 2, wherein the composition is subjected to at least one change of state at a mean temperature greater than or equal to approximately 160° C.

17. The method as claimed in claim 2, wherein the composition is subjected to at least one change of state at a mean temperature greater than or equal to approximately 180° C.

* * * * *